United States Patent
Hou et al.

(10) Patent No.: US 8,094,125 B2
(45) Date of Patent: Jan. 10, 2012

(54) ENCODING MODULE FOR INPUT DEVICE

(75) Inventors: Ting-Teng Hou, Taipei County (TW); Hui-Chen Chang, Taipei County (TW)

(73) Assignee: Kye Systems Corp., San Chung, Taipei (TW)

(*) Notice: Subject to any disclaimer, the term of this patent is extended or adjusted under 35 U.S.C. 154(b) by 679 days.

(21) Appl. No.: 12/232,554

(22) Filed: Sep. 19, 2008

(65) Prior Publication Data

US 2010/0013769 A1 Jan. 21, 2010

(30) Foreign Application Priority Data

Jul. 18, 2008 (TW) .............................. 97127493 A

(51) Int. Cl.
*G06F 3/033* (2006.01)
(52) U.S. Cl. ....................................................... 345/163
(58) Field of Classification Search ................... 345/163
See application file for complete search history.

(56) References Cited

U.S. PATENT DOCUMENTS

| | | | | |
|---|---|---|---|---|
| 6,459,421 B1* | 10/2002 | Cho et al. | ...................... | 345/166 |
| 6,967,645 B2* | 11/2005 | Wang | ............................. | 345/167 |
| 7,012,594 B2* | 3/2006 | Wang | ............................. | 345/163 |
| 7,295,185 B2* | 11/2007 | Wang | ............................. | 345/164 |
| 2005/0231463 A1* | 10/2005 | Yang | ............................. | 345/156 |
| 2006/0007153 A1* | 1/2006 | Ledbetter et al. | ............. | 345/163 |
| 2007/0097075 A1* | 5/2007 | Wang | ............................. | 345/163 |

FOREIGN PATENT DOCUMENTS

TW 420330 1/2001
* cited by examiner

*Primary Examiner* — Quan-Zhen Wang
*Assistant Examiner* — David Lee
(74) *Attorney, Agent, or Firm* — Bacon & Thomas, PLLC

(57) ABSTRACT

An encoding module applied to a computer input device is described, which includes an encoder and a scroll wheel. The encoder is electrically disposed on a circuit board of the computer input device and is protruded with a revolving shaft. The scroll wheel has a wheel axle passing there through and is rotatably disposed within a shell of the computer input device. One end of the wheel axle has two opposite clamping arms, so as to clamp the revolving shaft. Once the scroll wheel is rotated, the revolving shaft is driven to rotate together.

13 Claims, 5 Drawing Sheets

ENCODING MODULE FOR INPUT DEVICE

CROSS-REFERENCE TO RELATED APPLICATIONS

This non-provisional application claims priority under 35 U.S.C. §119(a) on Patent Application No(s). 097127493 filed in Taiwan, R.O.C. on Jul. 18, 2008 the entire contents of which are hereby incorporated by reference.

BACKGROUND OF THE INVENTION

1. Field of the Invention

The present invention relates to an input module, and more particularly to an encoding module applied to a computer input device.

2. Related Art

With the development and progress of science, a personal computer (PC), a notebook computer, or other computer devices have become an indispensable tool for the mass in daily life or work. However, the computer device must utilize a keyboard, a mouse, or other computer peripherals to execute various functions.

Taking the mouse for an example, recently, it has been widely used to manipulate window interfaces of the computer device, and has become one of the closely related peripheral hardware. In order to enable a user to quickly scroll a display image of the window, a rolling wheel is designed on the mouse, such that the user can directly scroll the window image, and it is not necessary to shift a mouse cursor to a scroll bar on a side edge of the window image, and then scroll the image up and down by using the button of the mouse.

A conventional rolling wheel has a spindle passing through a central position thereof, and may be assembled on a supporting frame in a rolling manner with the spindle as an axle center. An encoder is electrically disposed on a circuit board, and one end of the spindle facing the encoder is combined with the encoder. The user rotates the rolling wheel and drives the spindle to rotate together, so that the encoder is made to generate a control signal to the computer device, thereby controlling the motion of scrolling the page up and down.

Considering the conventional manner of combining the encoder with the spindle of the rolling wheel, for example, in an encoder configuration provided by the Taiwan Patent No. 420330, a hexagonal hole-shaped bearing is disposed on the encoder, and one end of the spindle is designed into a convex hexagonal shape matching with the bearing. When the rolling wheel and the encoder are combined, firstly, the spindle and the bearing of the encoder are made to be located on the same axle center, and then the rolling wheel is horizontally moved towards the direction of the encoder, such that the spindle is inserted into the bearing, thereby finishing the assembling process.

In the above manner of combining the encoder with the spindle, the rolling wheel and the encoder are combined in the horizontal direction. Due to the limitation of the assembling direction, during the process of assembling the mouse device, it is necessary to manually assemble the rolling wheel with the encoder, which cannot be achieved by an automatic device. It takes operators on the production line quite a lot of time to align the spindle with the bearing on the same axle center, such that the production efficiency cannot be further improved. If a certain careless mistake occurs, the spindle may be easily damaged, so as to reduce the rotating service life of the scroll wheel.

In addition, when the rolling wheel of the convention mouse is operated, the spindle of the rolling wheel bears a stress generated by the repeated rotations of the rolling wheel. After the mouse has been used for a long time, the structural strength of the spindle cannot bear the repeated stress any more, and as a result, the spindle structure is deformed or even damaged.

SUMMARY OF THE INVENTION

In view of the above problems, the present invention is directed to an encoding module, thereby solving the problems of the convention art that the spindle of the rolling wheel must be manually inserted in the encoder along the horizontal direction and cannot be achieved in an automatic manner, such that the fabricating cost is too high, and the revolving shaft structure is easily deformed or broken.

The encoding module provided by the present invention is applied to a computer input device. The computer input device has a shell and a circuit board located within the shell. The encoding module includes an encoder and a scroll wheel. The encoder is electrically disposed on the circuit board, and protruded with a revolving shaft on one side thereof. The scroll wheel has a wheel axle passing there through and is rotatably disposed within the shell. One end of the wheel axle has two opposite clamping arms, so as to clamp the revolving shaft. When the scroll wheel is rotated, the revolving shaft is driven to rotate together, such that the encoder outputs an encoding signal.

The efficacy of the present invention lies in that, by changing the structural configuration and assembling direction of the wheel axle of the scroll wheel and the revolving shaft of the encoder, the scroll wheel is assembled in a direction perpendicular to an axle center of the revolving shaft during the process of assembling the mouse, such that the assembling process is relatively quick and simple. Furthermore, it is possible to prevent the structure of the wheel axle from being deformed or damaged due to bearing the excessive large repeated stress for a long time, thereby reducing the fabricating cost and greatly improving the production efficiency and the yield.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

The encoding module provided by the present invention may be, for example, applied to computer peripherals, for example, including but not limited to, a mouse, a trackball, a game controller, and other computer input devices. In the following detailed descriptions of the present invention, the mouse is taken as the most preferred embodiment of the present invention. However, the accompanying drawings are merely provided for making references and descriptions, instead of limiting the present invention.

Figure 1A:
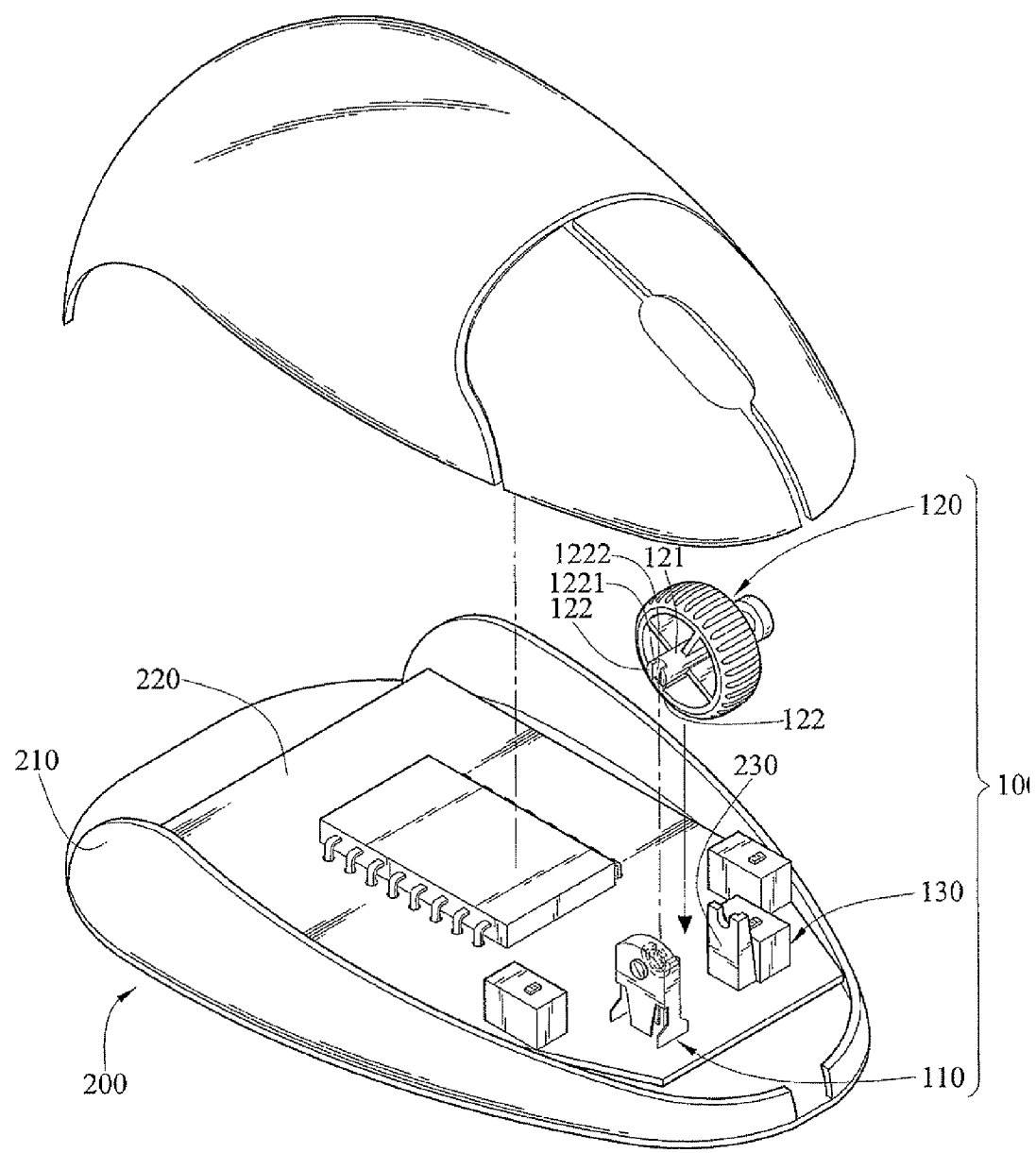
FIG. 1A is an exploded view of the present invention.
Figure 1B:
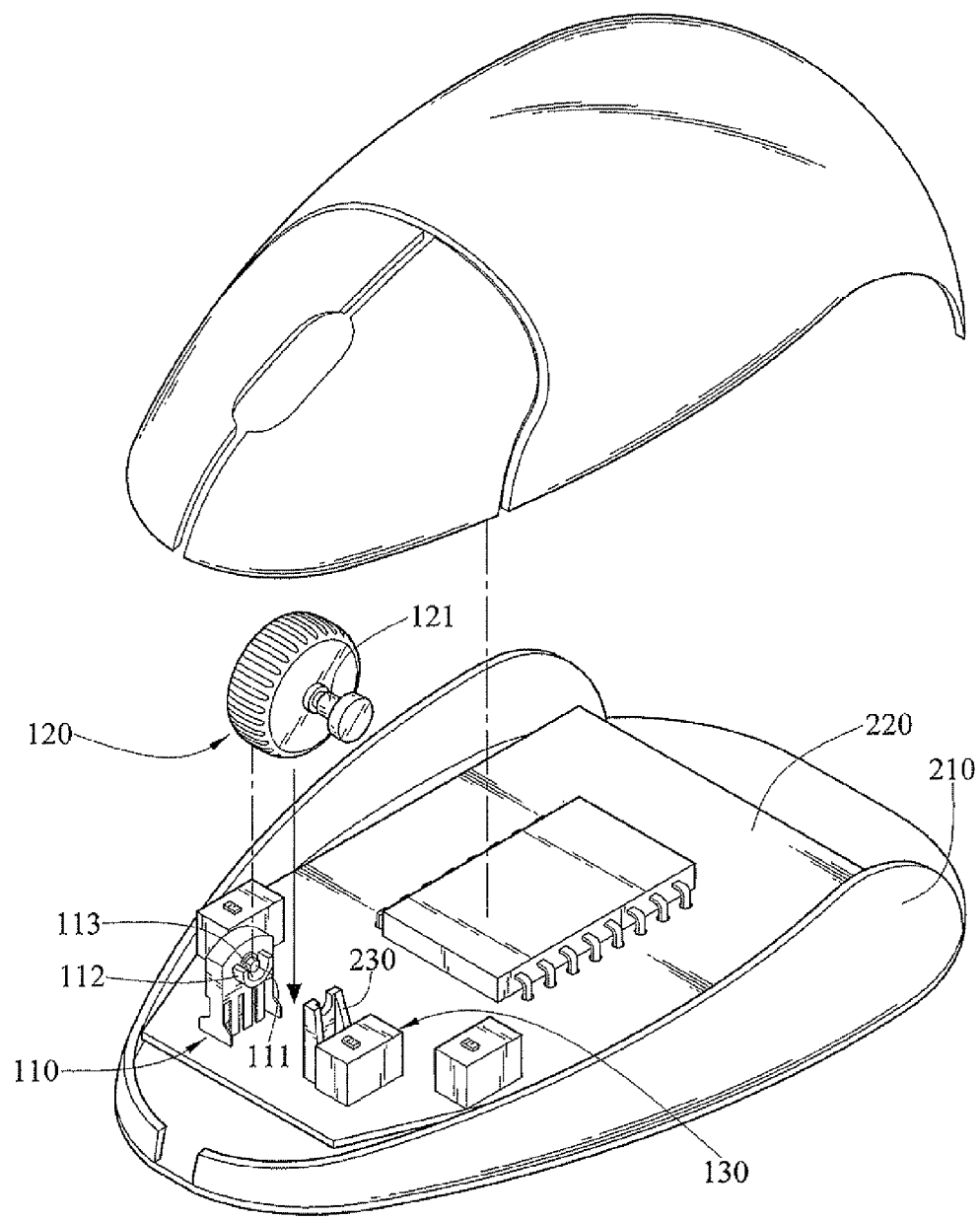
FIG. 1B is an exploded view of the present invention.
Figure 1C:
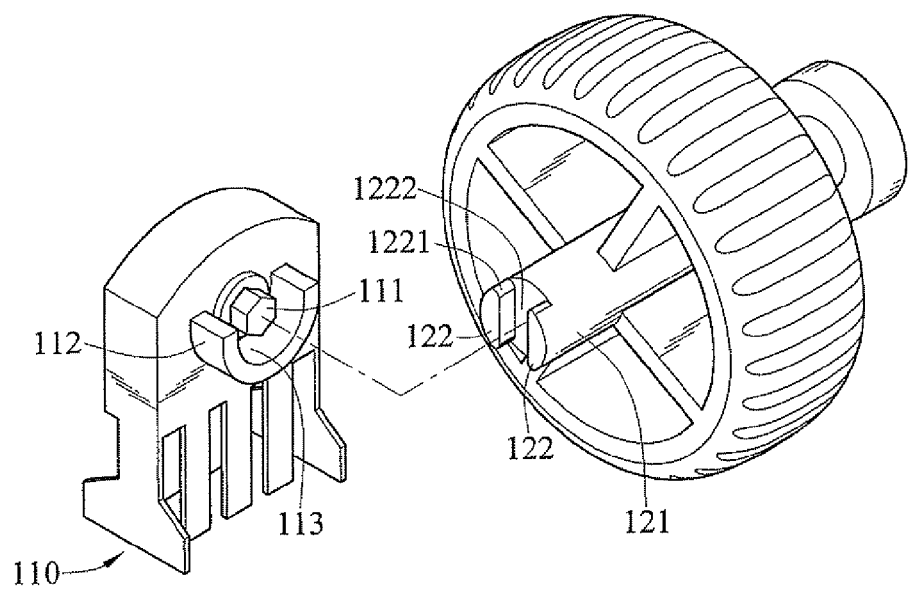
FIG. 1C is a detail exploded view of the encoder and the scroll wheel according to FIGS. 1A and 1B.
Figure 2:
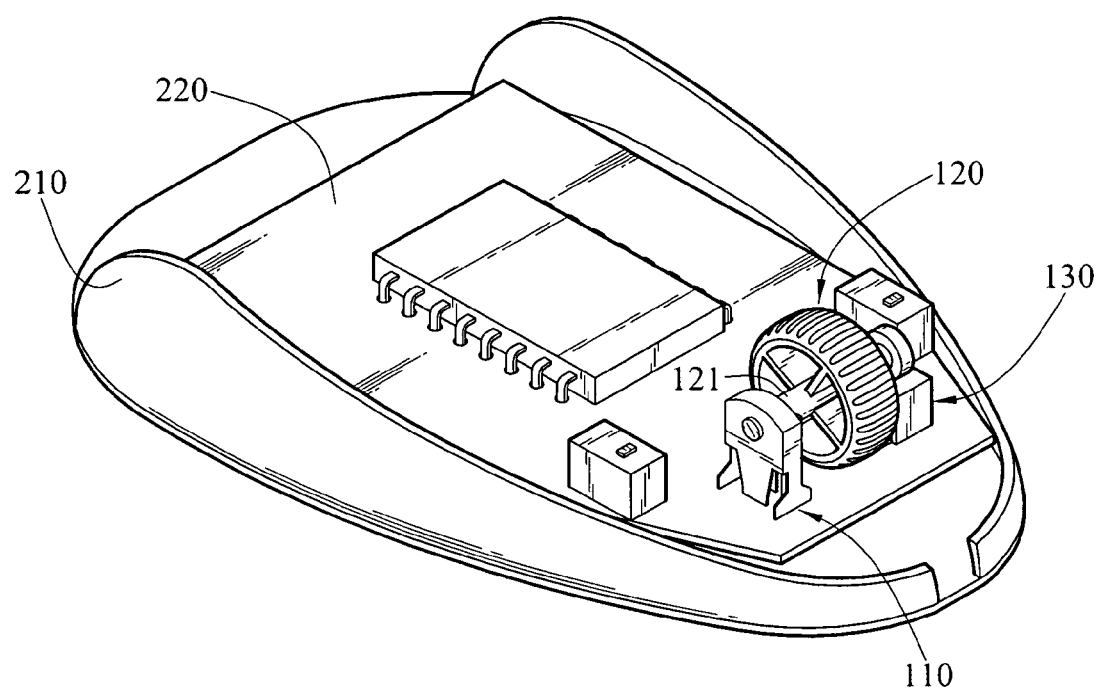
FIG. 2 is a schematic view of the present invention.
Figure 3:
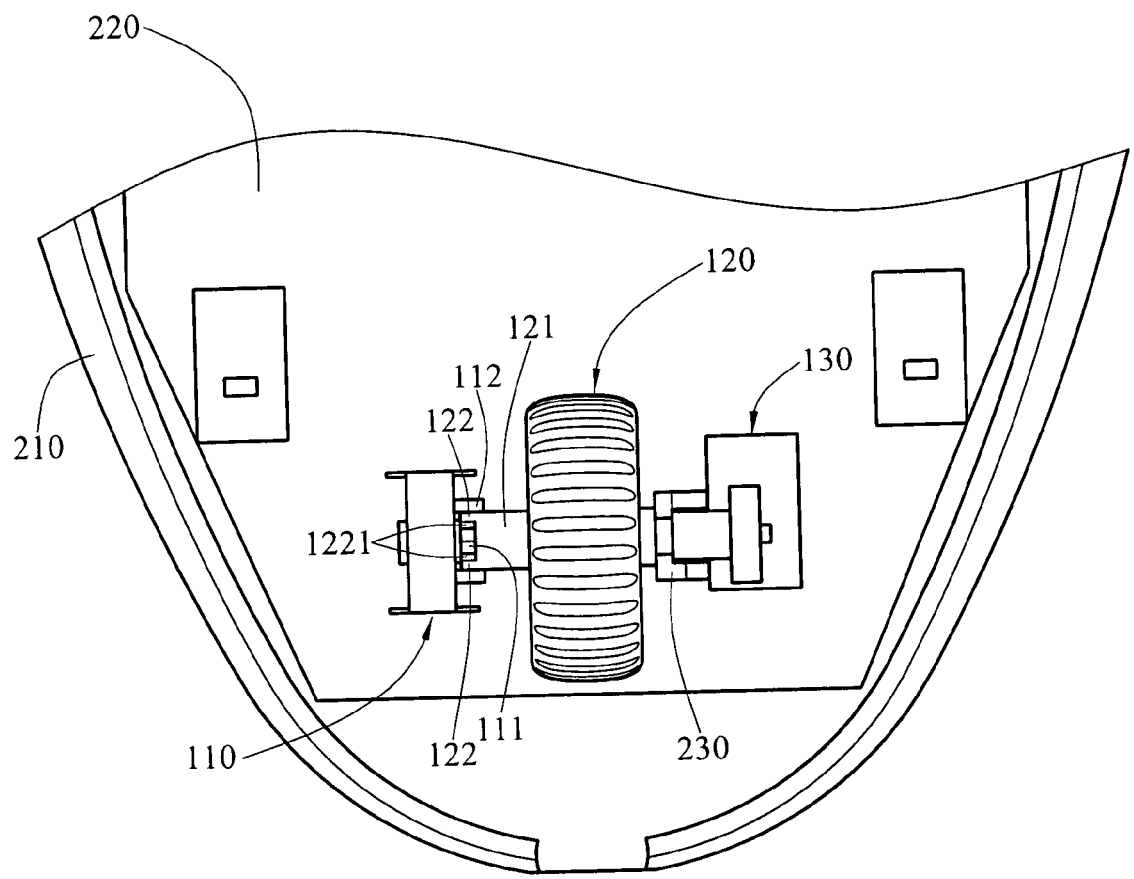
FIG. 3 is a partial top view of the present invention.

FIGS. 1A to 3 are schematic views of the present invention. An encoding module 100 provided by the present invention is assembled in a computer input device 200, in which the computer input device has a shell 210, and a circuit board 220 is disposed within the shell 210. The encoding module 100 of the present invention includes an encoder 110 and a scroll wheel 120. The encoder 110 is electrically disposed on the circuit board 220 and is protruded with a revolving shaft 111 on one side thereof, so as to ensure that the revolving shaft 111 and the wheel axle 121 are located on the same axle center line. The scroll wheel 120 has a wheel axle 121 passing through a central position thereof, such that the wheel axle 121 is divided to a first end and a second end. The scroll wheel 120 may be disposed within the shell 210 of the computer input device 200 in a manner of rotating freely.

The revolving shaft 111 of the encoder 110 may be, for example, a hexagonal prism-shaped structure. At a position close to a lower part of the revolving shaft 111, a bearing support 112 is disposed on one side of the encoder 110. The bearing support 112 has a bearing surface 113. Meanwhile, one side surface of the bearing support 112 opposite to the revolving shaft 111 is an arc-shaped structure. The first end of the wheel axle 121 of the scroll wheel 120 has two opposite clamping arms 122, and a clamping space 1222 matching with a shape of the revolving shaft 111 is defined by the two clamping arms 122. Each clamping arm 122 has a guiding inclined surface 1221, so as to guide the two clamping arms 122 to clamp the revolving shaft 111 of the encoder 110 there-between.

Referring to FIGS. 1A to 3, the wheel axle 121 of the scroll wheel 120 is assembled in a direction perpendicular to an axle center direction of the revolving shaft 111 of the encoder 110 (that is, the scroll wheel 120 is assembled in a direction from top to bottom), and two prismatic surfaces of the revolving shaft 111 are clamped by the two clamping arms 122, such that the revolving shaft 111 is maintained within the clamping space 1222 defined by the two clamping arms 122. The end of the wheel level 121 having the clamping arms 122 is placed on the bearing surface 113 of the bearing support 112, and the other end of the wheel axle 121 is clamped on a supporting base 230 on the circuit board 220, such that the scroll wheel 120 is rotatably assembled within the shell 210 in a balanced manner. When the user scrolls the scroll wheel 120 exposed out of the shell 210, the revolving shaft 111 combined with the wheel axle 121 is driven to rotate, such that the encoder 110 outputs an encoding signal (for example, controlling the scroll bar of the window interface to scroll the image up and down). The clamping space 1222 is slightly larger than the revolving shaft 111, such that a small gap still exists between the clamping arm 122 and the revolving shaft 111.

The wheel axle 121 of the present invention may be assembled in the direction from top to bottom as described above. Alternatively, the wheel axle 121 may also be horizontally assembled in a direction perpendicular to the axle center direction of the revolving shaft 111, or the wheel axle 121 may be combined with the revolving shaft 111 along a direction parallel with the axle center direction of the revolving shaft 111. In this manner, the wheel axle 121 of the present invention may be combined with the revolving shaft 111 along one direction selected from the above three axial directions. However, the most convenient and rapid assembling manner is combining the wheel axle 121 with the revolving shaft 111 along a direction from top to bottom, but the most appropriate assembling manner may be correspondingly selected according to the practical assembling situation.

In addition, it should be noted that, a micro-switch 130 may be disposed on a bottom side of the second end of the wheel axle 121. When the user presses the scroll wheel 120, since there is a gap between the clamping arm 122 and the revolving shaft 111, the scroll wheel 120 and the wheel axle 121 may be pivot to the revolving shaft 111 of the encoder 110. At this time, the wheel axle 121 triggers the micro-switch 130 through the pivotally rotating motion, and executes a preset function or command. Definitely, it should be understood that, if no gap exists between the clamping arm 122 and the revolving shaft 111, the micro-switch 130 may also be triggered by an elastic deformation generated once the wheel axle 121 is applied with a force. At this time, the wheel axle 121 is still pivotally rotated with the revolving shaft 111 as a pivot.

In the encoding module of the present invention, by changing the structural configuration and assembling direction of the wheel axle of the scroll wheel and the revolving shaft of the encoder, the assembling process of the mouse is relatively quick and simple. Furthermore, the wheel axle is protected from being deformed or damaged due to bearing the repeated stress for a long time, so as to obtain a long service life, such that the scroll wheel is well rotated, thereby significantly reducing the fabricating cost and greatly improving the production efficiency and the yield.

What is claimed is:

1. An encoding module, applied to a computer input device, wherein the computer input device has a shell, and a circuit board disposed within the shell, the encoding module comprising:
    an encoder, electrically disposed on the circuit board, the encoder having a revolving shaft that protrudes from one side of the encoder; and
    a scroll wheel, having a wheel axle that passes through the scroll wheel and is rotatably disposed within the shell, wherein one end of the wheel axle has two opposite clamping arms to clamp the revolving shaft;
    wherein the two clamping arms clamp the revolving shaft, so that when the scroll wheel is rotated, the revolving shaft is driven to rotate together.

2. The encoding module according to claim 1, wherein one side of the encoder further has a bearing support, and the end of the wheel axle having the two clamping arms is placed on the bearing support.

3. The encoding module according to claim 2, wherein the bearing support has a bearing surface matching with a shape of the wheel axle.

4. The encoding module according to claim 1, wherein the revolving shaft has a hexagonal prism-shaped structure, and two prismatic surfaces of the revolving shaft are clamped by the two clamping arms, so as to combine the wheel axle with the revolving shaft.

5. The encoding module according to claim 1, wherein each clamping arm has a guiding inclined surface, so as to guide the two clamping arms to clamp the revolving shaft.

6. The encoding module according to claim 1, wherein a micro-switch is disposed on one side of the other end of the wheel axle.

7. The encoding module according to claim 6, wherein a supporting base is located between the scroll wheel and the micro switch.

8. An encoding module, comprising:
    a scroll wheel capable of rotating freely and a circuit board;
    wherein the circuit board is electrically connected with an encoder thereon, the scroll wheel has a wheel axle passing that passes through the scroll wheel, the wheel axle has a first end and a second end, the first end of the wheel axle has a clamping space; the encoder has a revolving shaft that protrudes from the encoder, and the revolving shaft is clamped within the clamping space, and
    wherein when the scroll wheel is rotated, the wheel axle rotates together with the scroll wheel, and the first end of the wheel axle drives the revolving shaft of the encoder to rotate together with the scroll wheel.

9. The encoding module according to claim 8, wherein a bottom side of the revolving shaft has a bearing support.

10. The encoding module according to claim 9, wherein a micro-switch is disposed on one side of the second end of the wheel axle, and the scroll wheel and the wheel axle pivot to the revolving shaft of the encoder as to trigger the micro-switch.

11. The encoding module according to claim 10, wherein a supporting base is located between the scroll wheel and the micro switch.

12. The encoding module according to claim 8, wherein a micro-switch is disposed on one side of the second end of the wheel axle, and the scroll wheel and the wheel axle pivot to the revolving shaft of the encoder as to trigger the micro-switch.

13. The encoding module according to claim 12, wherein a supporting base is located between the scroll wheel and the micro switch.

* * * * *